UNITED STATES PATENT OFFICE.

HENRY STALAY ARTHUR HOLT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

MANUFACTURE OF ISOPRENE AND HOMOLOGUES THEREOF.

1,168,070. Specification of Letters Patent. Patented Jan. 11, 1916.

No Drawing. Application filed June 13, 1912. Serial No. 703,417.

*To all whom it may concern:*

Be it known that I, HENRY STALAY ARTHUR HOLT, subject of the King of England, residing at Ludwigshafen-on-the-Rhine, Germany, have invented new and useful Improvements in the Manufacture of Isoprene and Homologues Thereof, of which the following is a specification.

The specification of Patent No. 1,065,182 describes the manufacture of isoprene by heating vaporized dipentene in a state of dilution.

I have now found that butadiene and members of the same homologous series (which I hereinafter term butadiene hydrocarbons) can be obtained in a similar manner from the mixture of dipolymerized, or more highly polymerized, products of butadiene hydrocarbons other than caoutchouc-like matter, which mixture results as a by-product in the manufacture of caoutchouc, or caoutchouc-like bodies, from butadiene hydrocarbons. The polymerized products are preferably separated from the unaltered butadiene hydrocarbons, before being treated according to my invention, and the said by-products can then be treated directly as they are obtained by distillation with steam, or they can be previously subjected to fractional distillation *in vacuo*.

According to Harries (*Annalen der Chemie*, vol. 383, page 205) the polymerized by-products obtainable from isoprene consists probably of a body $C_{10}H_{16}$ which contains an open chain. Di-pentene, if at all, is present only in minute quantities.

The following is an example of how my invention can be carried into practical effect, but the invention is not confined to this example: Separate, from any unaltered initial product, the oil which is obtained as a by-product in the manufacture of caoutchouc from 2.3-dimethyl-1.3-butadiene, and distil the said oil with steam. Then vaporize it and pass it at the rate of from 60 to 70 grams per hour through a tube 0.5 meter in length containing a platinum wire 3 meters in length and 0.5 millimeter in diameter, while using a current of 400 volt-amperes and employing a pressure of 20 millimeters. The temperature varies between 500° and 700° C. The distillate consists principally of 2.3-dimethyl-1.3-butadiene and small quantities of some hydrocarbons of higher boiling point.

Instead of employing electrical heating, the reaction may be carried out in a tube, or other receptacle, containing suitable material and heated externally.

In a similar manner, the by-products obtained by polymerizing, to caoutchouc, other hydrocarbons of this class, can be treated to produce the initial products.

Now what I claim is:—

The process of producing butadiene hydrocarbons by heating in the vaporized condition, while in a state of dilution and in the practical absence of other organic hydrocarbons, the mixture of polymerized products other than caoutchouc-like matter resulting in the polymerization of butadiene hydrocarbons.

In testimony whereof I have hereunto set my hand in the presence of two subscribing witnesses.

ARTHUR HOLT.

Witnesses:
J. ALEC. LLOYD,
JOSEPH PFEIFFER.